United States Patent [19]

Pilot

[11] Patent Number: 4,751,566
[45] Date of Patent: Jun. 14, 1988

[54] METHOD AND DEVICE FOR GAMMA CORRECTION IN MULTICHROME CATHODE RAY TUBES

[75] Inventor: Alain Pilot, Voisins Le Bretonneux, France

[73] Assignee: Societe Francaise d'Equipements pour la Navigation Aerienne (S.F.E.N.A.), Velizy Villacoublay, France

[21] Appl. No.: 30,649

[22] Filed: Mar. 26, 1987

[30] Foreign Application Priority Data

Apr. 4, 1986 [FR] France .................. 86 04836

[51] Int. Cl.$^4$ ............................ H04N 9/69
[52] U.S. Cl. .................... 358/32; 258/164
[58] Field of Search .............. 358/32, 164, 29, 27, 358/28, 168

[56] References Cited

U.S. PATENT DOCUMENTS

| | | | |
|---|---|---|---|
| 3,684,825 | 8/1972 | Dischert et al. | 358/32 X |
| 4,415,923 | 11/1983 | Noda | 358/32 X |
| 4,489,349 | 12/1984 | Okada | 358/32 X |

Primary Examiner—James J. Groody
Assistant Examiner—Victor R. Kostak
Attorney, Agent, or Firm—William A. Drucker

[57] ABSTRACT

A gamma correction method and device are provided for multichrome cathode ray tubes, including, for each of the n-1 electron guns of the tube, a correction circuit adapted for raising the cathode modulation of this gun to a power $\gamma_{ref}/\gamma_i$ in which the term $\gamma_{ref}$ is the gamma exponent of the nth gun which is taken as reference and the term $\gamma_i$ is the gamma exponent of the gun considered. With this device the chromaticity of the colors displayed on the screen are conserved throughout the whole contrast dynamics of the tube.

10 Claims, 3 Drawing Sheets $$L_R = K_R (M_R)^{\gamma_R}$$
$$L_G = K_G (M_G)^{\gamma_G}$$
$$L_B = K_B (M_B)^{\gamma_B}$$

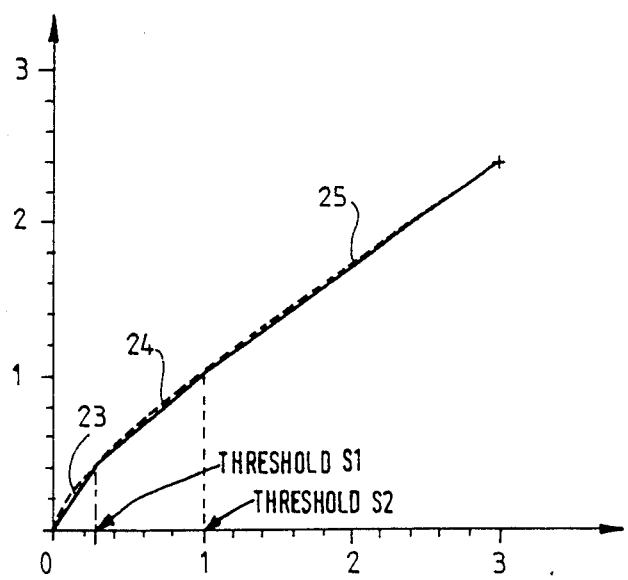

METHOD AND DEVICE FOR GAMMA CORRECTION IN MULTICHROME CATHODE RAY TUBES

BACKGROUND OF THE INVENTION

1. Field of the Invention

The present invention relates to a method and device for gamma correction in multichrome cathode ray tubes.

Its aim is more particularly to ensure conservation of the chromaticity of the colors displayed on the screen, over the whole dynamic range of adjustment of the contrast of the tube.

2. Description of the Prior Art

It is generally known that, in a conventional trichromatic cathode ray tube, the color picture points are each formed of three primary juxtaposed luminophore elements of red, green and blue color. These luminophore elements are excited by the flow of electrons from three electron guns assigned respectively to these three primary colors.

Such as seen by an observer, the color of this image point then consists in the additive synthesis of these three primary colors and depends on the relative proportions of the luminances $L_R$, $L_G$, $L_B$ of these elements.

Now, the luminances generated by the three guns have as expression:

$$L_R = K_R(M_R)^{\gamma_R} \text{ (red gun)}$$

$$L_G = K_G(M_V)^{\gamma_G} \text{ (green gun)}$$

$$L_B = K_B(M_B)^{\gamma_B} \text{ (blue gun)}$$

in which expressions, for a color, R, G, B shown in subscript:

the term M represents the cathode modulation;

the term $\gamma$ represents the gamma exponent (between 2 and 3);

the term K is a constant.

It proves then that the transfer function $L = f(M)$ is different for each gun.

Furthermore, the contrast control acts simultaneously on the modulation of the three video channels, so that when this control varies the relative proportions of the luminances are modified because of the differences between the transfer functions of the guns. A variation of the chromaticity may then be observed depending on the contrast adjustment.

This drawback is particularly important in numerous applications which require considerable contrast variations and in which the colors form part of a symbology and have very precise meanings. Such is the case particularly in aeronautics.

For overcoming these disadvantages it has been proposed to introduce a correction (gamma correction) of type $1/\gamma_i$ in each video channel so as to linearize the transfer curves $L = f(M)$ of each of the guns.

However, this method comprises the following limitations:

the correction circuits placed directly in the video channels must have a wide pass band;

the high correction amplitude ($M\,1/\gamma$) requires use of expensive techniques for attaining the precision and stability required;

the luminance emitted by the tube is proportional to the contrast control; since perception of the eye is logarithmic, the result is a loss of sensitivity for the low levels; the video signals and the contrast control signal must therefore be compensated for accordingly;

in an assembly including a camera connected to the tube, the fact of linearizing the response of the tube impairs restitution of the grey levels from the camera whose transfer function (analysis gamma) is substantially the reverse of that of the uncorrected tube.

SUMMARY OF THE INVENTION

The purpose of the invention is therefore to overcome these drawbacks. It provides a gamma correction method for multichrome tubes which consists more particularly:

in taking as reference the transfer function $L_{ref} = K_{ref}(M_{ref})^{\gamma_{ref}}$ relative to one of the guns of the tube, and in applying to the other guns a differential correction so that the modulation $M_i$ of these guns passes to a value $M_i \gamma_{ref}/\gamma_i$ in which $\gamma_i$ is the gamma exponent of the gun considered so as to make the transfer functions of these guns proportional to that of the gun taken as reference and so that consequently the ratio of the luminances remains constant whatever the control level of the contrast.

With this method, the correction to be made has a much smaller amplitude than the correction of type $1/\gamma_i$ usually adopted.

This correction may then be advantageously put into effect by creating a mathematical model of the correction curve by means of straight line segments which each correspond to a range of variation of the modulation signal, and by amplifying this signal with a gain depending on the slope of the corresponding straight line segment of the model of the curve created, the technique used for this purpose being that of a slope switching device.

It has proved that this solution is all the more efficient the lower the amplitude of the correction (a reduced number of slopes ensuring an excellent correction precision). It has the further advantage of being very stable with respect to the temperature.

Another advantage of the above described method consists in the fact that the correction to be made to the modulation $M_i$ may be applied either directly in the video channel, or to the contrast control.

Of course, the invention also relates to gamma correction devices using the above defined method.

BRIEF DESCRIPTION OF THE DRAWINGS

Other features and advantages of the invention will be clear from the embodiments described hereafter, given solely by way of non limitative examples, with reference to the accompanying drawings in which:

FIG. 7 is a diagram showing one method of creating a mathematical model of the correction curve by means of straight line segments.

DESCRIPTION OF THE PREFERRED EMBODIMENTS

Figure 1:
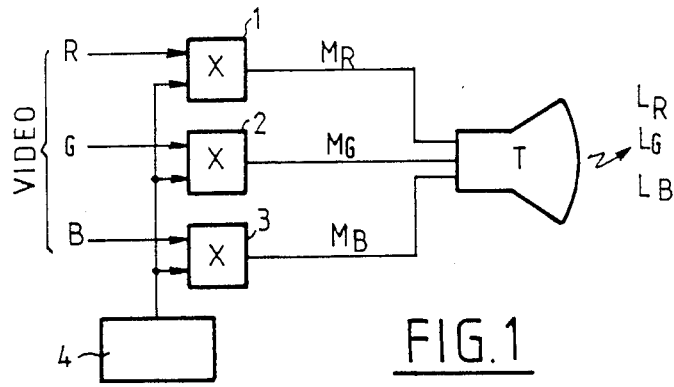
FIG. 1 shows schematically the video circuit generally equipping a trichrome cathode ray tube.

The circuit shown in FIG. 1 includes conventionally three video lines R, G, B assigned to the three primary colors, namely red for line R, green for line G and blue for line B. These three lines R, G, B are connected respectively to the three electron guns of a trichrome electron tube T, through three circuits 1, 2, 3 adapted for causing a variation of contrast in response to the same control signal C coming from contrast adjustment device 4.

These circuits 1, 2, 3 deliver then electric modulation signals $M_R$, $M_G$, $M_B$ which are transformed respectively by tube T into luminance light signals $L_R$, $L_G$ and $L_B$ having for expression:

$$L_R = K_R (M_R)^{\gamma R}$$

$$L_G = K_G (M_G)^{\gamma G}$$

$$L_B = K_B (M_B)^{\gamma B}$$

Figure 2:
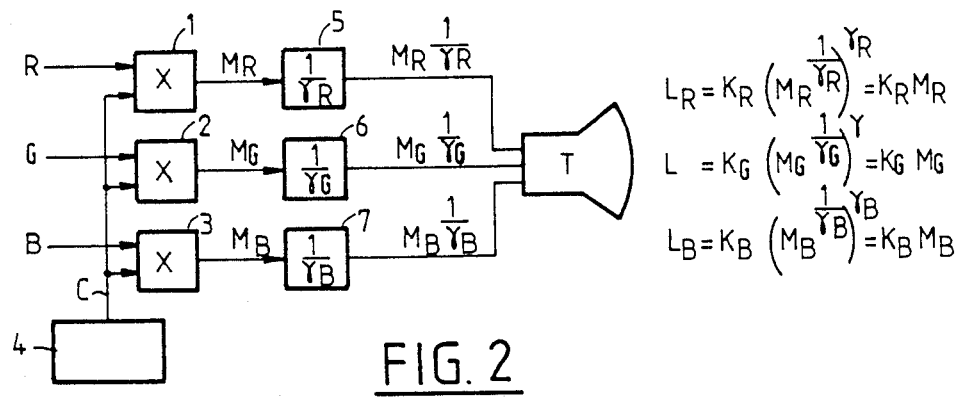
FIG. 2 is a diagram similar to that of FIG. 1, in which appear the gamma correction circuits usually used.

The conventional solution for providing gamma correction consists in using in each of the video lines a correction circuit 5, 6, 7 raising the modulation signals $M_R$, $M_G$ and $M_B$ respectively to the powers $1/\gamma_R$, $1/\gamma_G$ and $1/\gamma_B$ (FIG. 2).

The expressions of the luminances $L_R$, $L_G$ and $L_B$ then become:

$$L_R = K_R \left( M_R^{\frac{1}{\gamma R}} \right)^{\gamma R} = K_R M_R$$

$$L_G = K_G \left( M_G^{\frac{1}{\gamma G}} \right)^{\gamma G} = K_G M_G$$

$$L_B = K_B \left( M_B^{\frac{1}{\gamma B}} \right)^{\gamma B} = K_B M_B$$

Linearization of the transfer curves is obtained.

Figure 3:
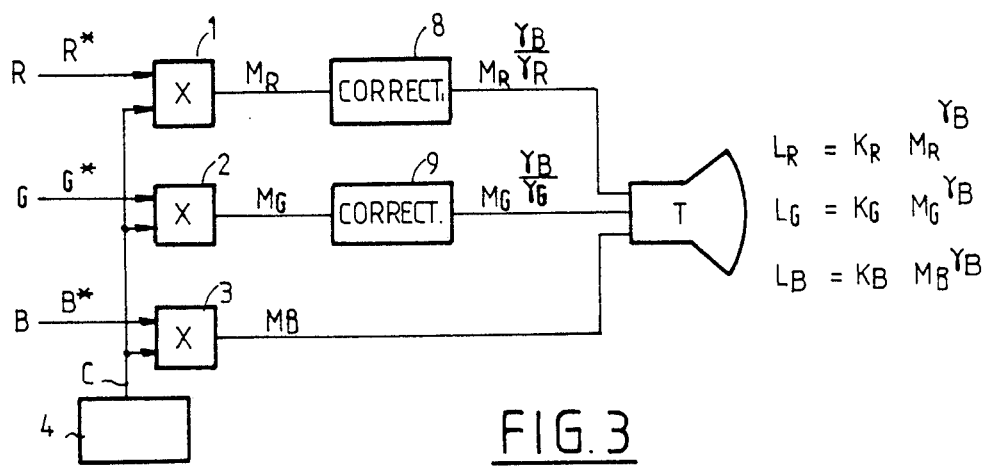
FIG. 3 illustrates, in a circuit similar to that of FIGS. 1 and 2, the principle of the method of the invention, in the case where the correction is made directly on the video signal.
Figure 4:
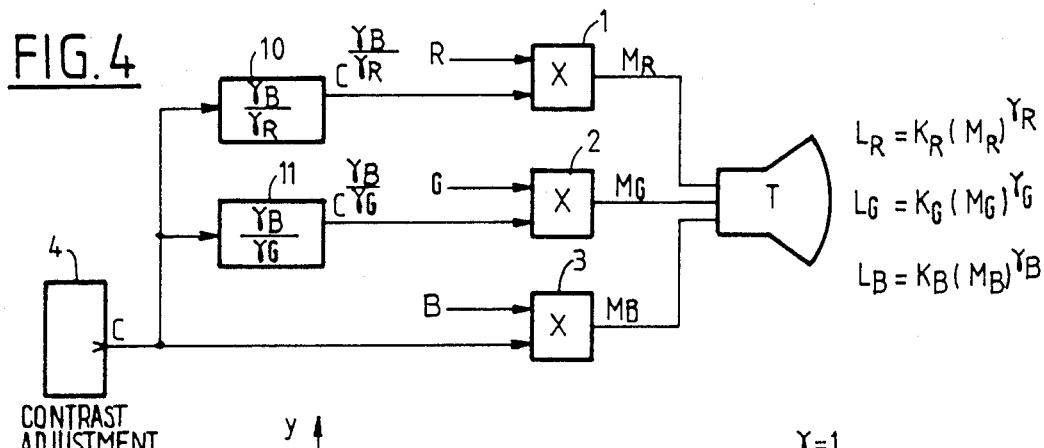
FIG. 4 shows schematically another embodiment of the invention in which the correction is made on the contrast control.

The drawbacks of this solution which have been outlined above, are suppressed using the correction method of the invention whose principle is illustrated by means of the circuits shown in FIGS. 3 and 4.

In the circuit shown in FIG. 3, the correction takes place in two of the three lines of the video channel, namely the lines R and G.

It consists in taking as reference the transfer function of one of the guns, here the blue gun, and in correcting the modulation $M_R$ and $M_G$ of the other guns by means of the correction circuits 8, 9, raising the modulation $M_R$ to the power $\gamma_B/\gamma_R$ and the modulation $M_G$ to the power $\gamma_B/\gamma_G$.

The luminances obtained on the screen are then in the form:

$$L_R = K_R \left( M_R^{\frac{\gamma B}{\gamma R}} \right)^{\gamma R} = K_R M_R^{\gamma B}$$

$$L_G = K_G \left( M_G^{\frac{\gamma B}{\gamma G}} \right)^{\gamma G} = K_G M_G^{\gamma B}$$

$$L_B = K_B (M_B^{\gamma B})$$

In other words, the transfer functions of the R and G lines are referred to that of line B.

Consequently, the luminance ratios are conserved whatever the level of the contrast control. In fact, the relations between the modulation and the contrast control C may be expressed in the following way:

$$M_R = C \times R^*$$

$$M_G = C \times G^*$$

$$M_B = C \times B^*$$

In which expressions the terms $R^*$, $G^*$ and $B^*$ represent respectively the information relative to the red, green and blue colors of lines R, G, B upstream of the circuit 1, 2 and 3.

The expressions of the luminances then become:

$$L_B = K_B (C \times B^*)^{\gamma B},$$

$$L_R = K_R (C \times R^*)^{\gamma B}, \text{ and}$$

$$L_G = K_G (C \times G^*)^{\gamma B}.$$

The ratio of the luminances $L_B$ and $L_R$ is then:

$$\frac{L_B}{L_R} = \frac{K_B}{K_R} \cdot \frac{(C \times B^*)^{\gamma B}}{(C \times R^*)^{\gamma B}}$$

It is clear that this ratio remains constant whatever the value of the control voltage c.

It is moreover apparent that, contrary to conventional gamma correction devices, a linear variation of the contrast control c is perceived linearly by the eye. In fact, the logarithmic perception of the eye is compensated for by the exponential response of the tube.

Furthermore, it should be noted that the signal delivered by a monochrome video camera is of the form:

$$V = k_a L_a^{\gamma a}$$

In which expression:
V is the voltage delivered,
$L_a$ is the luminance received by the camera,
$\gamma_a$ is the analysis gamma ($\simeq 0.4$),
$K_a$ is a constant.

The connection of this camera to a cathode ray tube through a video processing circuit including a correction circuit in accordance with the invention leads to obtaining a restored luminance $L_{RES}$ of the form:

$$L_{RES} = K_{RES} k_a L_a^{\gamma a \gamma RES}$$

$\gamma_{RES}$ is the gamma of the tube
$K_{RES}$ is a constant.

Now, the luminance $L_{RES}$ restored by the tube must be proportional to the luminance $L_a$ analysed by the camera (correct restitution of the grey levels). This condition is fulfilled for $\gamma_{RES} = 1/\gamma_a$.

In practice, the analysis gamma $\gamma_a$ is the reverse of the gamma of a cathode ray tube; the condition is thus automatically fulfilled and may be applied by taking as reference gamma for the tube the reverse of the specified analysis gamma.

This condition is not obtained in the case of a conventional correction of type $1/\gamma_i$ aiming at linearizing the transfer functions of the tube. It is then necessary to precorrect separately the signal coming from the camera, which forms a relatively important disadvantage.

In the variant of construction shown in FIG. 4, the correction is no longer made in the video channel of the tube but in the contrast control circuit.

In this example, this correction is provided by two correction devices 10, 11 acting on the contrast control signal c between the contrast variation circuits 1, 2 and the contrast adjustment device 4.

The correction devices 10 and 11 cause the control signal c to be transformed into a signal of the form $$c^{\frac{\gamma B}{\gamma R}}$$

for the contrast control associated with the red video line R and into a signal of the form $$c^{\frac{\gamma B}{\gamma G}}$$

for the contrast control associated with the green video line G.

As before, luminance signals may be obtained having the following form:

$L_B = K_B(C \times B^*)^{\gamma B}$ $L_R = K_R(C \times R^*)^{\gamma B}$, and $L_G = K_G(C \times G^*)^{\gamma B}$ This solution has an additional advantage with respect to the preceding one. The correction circuits 10, 11 do not need to have a high pass band ($\simeq$ video) since they are placed in a slow control circuit.

In this type of application, the transfer function differs according to whether the input variable is the contrast control signal c or the video signals R, G, B.

Thus in the case where the input variable is the signal c with the signals R, G, B as parameters, the transfer function will be of the form:

$L_i = K_i(M_i)^{\gamma REF}$ $\gamma_{REF}$ being the coefficient of the reference gun.

On the other hand, in the case where the input variables are the video signals R, G, B with signal c as parameter the transfer function will be of the form:

$L_i = K_i(M_i)^{\gamma i}$ $\gamma_i$ being the $\gamma$ coefficient of the gun considered.

Figure 5:
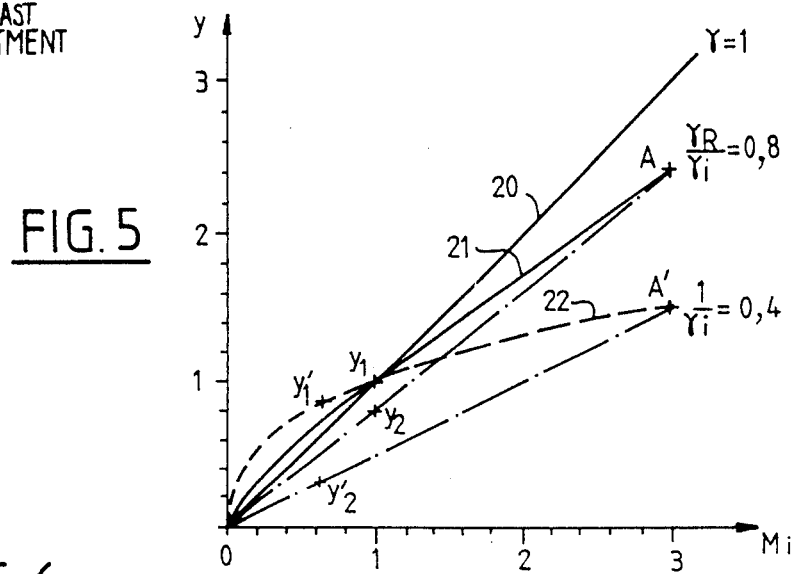
FIG. 5 is a diagram illustrating the amplitude of the correction made in accordance with the method of the invention and that relative to a conventional gamma correction.

Curves given in the diagram of FIG. 5 show that the amplitude $\Delta y$ of the corrections carried out by the devices 8, 9, 10, 11 of the present invention remains very much less than the amplitude of the conventional corrections of type $1/\gamma_i$.

These curves have been plotted for an example including:

a reference gamma exponent $\gamma_R + 2$ a gamma exponent of one of the other guns $\gamma_i = 2.5$ cathode modulation $M_i$ (which corresponds to the "full on" of the tube) equal to $M_i = 3$.

The diagram includes more particularly:

a curve 20 of the form $y = M_i$ (with a gamma equal to 1), a curve 21 of the form $$y = M_i^{\frac{\gamma ref}{\gamma i}}$$

which, by taking the above indicated values, becomes $y = M_i^{0.8}$, a curve 22 of the form:

$$y = M_i^{\frac{1}{\gamma i}},$$

namely $y = M_i^{0.4}$.

In the case of curve 21, which corresponds to the solution proposed by the present invention, the correction $\Delta y$ has a maximum amplitude when the drift of the function $y = M_i^{0.8}$ is equal to the slope of the straight line OA, point A having as coordinates:

$$\begin{cases} M_i = 3 \\ y = 3^{0.8} = 2.41. \end{cases}$$

The slope of the straight line OA is equal to $$\frac{y}{M_i} = \frac{2.41}{3} = 0.8$$

and the drift of the function is written:

$$\frac{dy}{dM_i} = 0.8 \, M_i^{-0.2}$$

The value of $M_i$ corresponding to this maximum amplitude is divided therefrom:

$0.8 M_i^{-0.2} = 0.8 \rightarrow M_i = 1$ then the values $y_1$ and $y_2$ corresponding to this value of $M_i$ on curve 21 and on the straight line OA, $y_1 = M_i^{0.8} = 1$ $y_2 = 0.8 M_i = 0.8$ The maximum amplitude of the correction is then obtained by the difference:

$y_1 - y_2 = \Delta_y = 0.2$

The maximum amplitude of the correction of type $1/\gamma_i$ (curve 22) is determined analogically, with: the coordinates of point A' equal to $M_i = 3$ and $y' = 3^{0.4} = 1.55$ the slope of segment OA' equal to $$\frac{y'}{M_i} = 0.52$$

the drift $$\frac{dy'}{dM_i} = 0.4 \, M_i^{-0.6} = 0.52$$

the value of $M_i$ corresponding to the maximum amplitude $M_i = 0.65$
the values $y'_1$ and $y'_2$:

$$y'_1 = 0.65^{0.4} = 0.84$$

$$y'_2 = 0.65 \times 0.52 = 0.34$$

Thus a maximum correction amplitude $y'_1 - y'_2 = 0.5$ is obtained. It is clear that this maximum amplitude is much greater than that obtained previously, namely:

$$y_1 - y_2 = 0.2.$$

Figure 6:
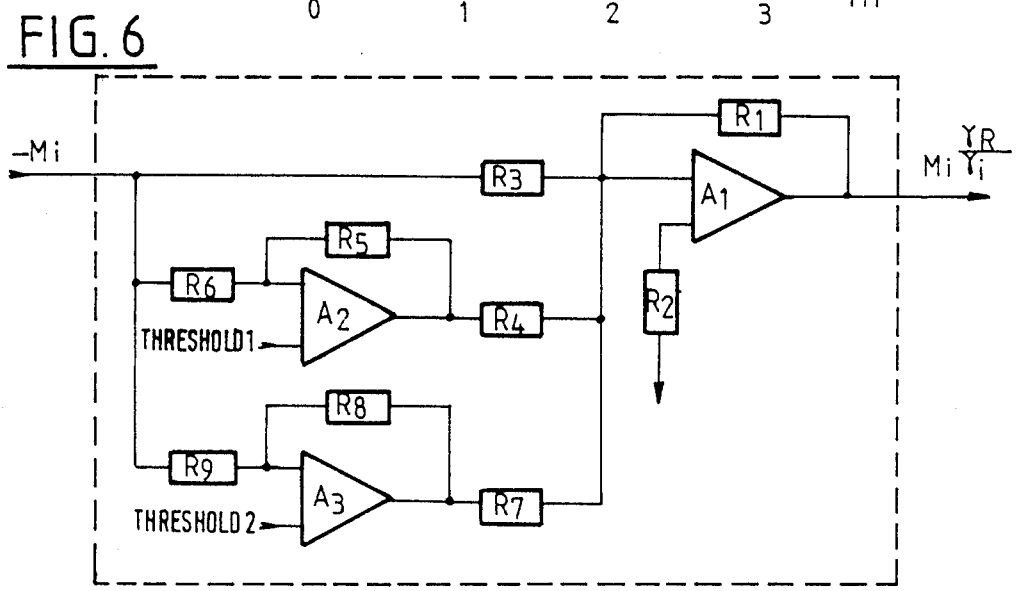
FIG. 6 shows schematically a slope switching correction circuit.

With this feature, a switching device may be used for the correction having a slope such as the one shown in FIG. 6 and which comprises:

an amplifier-summator circuit including conventionally an operational amplifier A1 and resistors R1 and R2 the input of this amplifier receiving the signal $-M_i$ through:

a resistor $R_3$, a first threshold device (of threshold $S_1$) including the operational amplifier $A_2$ and the resistors $R_4$, $R_5$, $R_6$, and a second threshold device (of threshold $S_2$ greater than $S_1$) including the operational amplifier $A_3$ and the resistors $R_7$, $R_8$, $R_9$.

This correction device therefore allows a mathematical model to be created of the correction curve in three straight line sections such as shown in FIG. 7, namely:

a first straight line segment 23 included between point O and the value of $M_i$ corresponding to the threshold $S_1$ of the first threshold device, the slope of this segment corresponding to the gain of the amplifier circuit $A_1$, $R_1$, $R_2$, $R_3$;

a second straight line segment 24 included between the values of $M_i$ corresponding to the thresholds $S_1$ and $S_2$ of the two threshold devices, the slope of this second segment corresponding to the sum of the gains of the amplifier circuit $A_1$, $R_1$, $R_2$, $R_3$ and of the first threshold device; and a third straight line segment 25 included between the value of $M_i$ corresponding to the threshold $S_2$ and the value of $M_i$ corresponding to the point A such as previously defined, the slope of this third segment corresponding to the sum of the gains of the amplifier circuit and of the two threshold devices.

The principle of this correction device is therefore particularly simple. Although a mathematical model may be created of the correction curve using a very reduced number of segments, an excellent precision of correction is however obtained. This device has the further advantage of being very stable with respect to the temperature.

What is claimed is:

1. A gamma correction method for multichrome cathode ray tubes equipped with a contrast control circuit acting simultaneously on the cathode modulation signals of the electron guns of the tube, comprising:

taking as reference the transfer function $L_{ref} = K_{ref}(M_{ref})^{\gamma_{ref}}$ relative to one of the guns of the tube, $L_{ref}$ being the luminance generated by the reference gun, $M_{ref}$ being the modulation applied to the cathode of the reference gun, $K_{ref}$ being representative of a constant and the term $\gamma_{ref}$ representing the gamma exponent of the reference gun, and applying to the other guns a differential correction causing the cathode modulation $M_i$ of these other guns to pass to a value $M_i^{\gamma_{ref}/\gamma_i}$ in which the exponent $\gamma_i$ is the gamma exponent of the gun considered so as to make the transfer functions of said other guns proportional to that of the gun taken as reference, and so that consequently the ratio of the luminances remains constant whatever the contrast control level of the tube.

2. The method as claimed in claim 1, wherein said correction is carried out by creating, with straight line segments, a mathematical model of a correction curve defined by a relation $y = M_i^{\gamma_{ref}/\gamma_i}$ y representing the amplitude of the correction.

3. The method as claimed in claim 1, which comprises the step of applying said correction in the video channel, to the cathode modulation signals of the electron guns.

4. The method as claimed in claim 1, which comprises the step of applying said correction to the contrast control.

5. The method as claimed in claim 1, wherein said correction includes for each of the electron guns considered the steps of:

determining the curve of correction to be made to the cathode modulation signal of this gun, creating a mathematical model of this correction curve by means of straight line segments which each correspond to a range of variation of the modulation signal, amplifying the modulation signal in each of said ranges with a gain depending on the slope of the corresponding straight line segment of the model curve.

6. A device for effecting a gamma correction for a multichrome cathode ray tube provided with n electrode guns, said device comprising for each of the $n-1$ electron guns of the tube a correction circuit adapted for raising the cathode modulation of this gun to a power $\gamma_{ref}/\gamma_i$, in which the term $\gamma_{ref}$ is the gamma exponent of the nth gun which is taken as reference and the term $\gamma_i$ is the gamma exponent of the gun considered.

7. The device as claimed in claim 6, wherein said correction circuits are disposed in the red and green video circuits connecting the contrast variation circuits to the $n-1$ corresponding electron guns.

8. The device as claimed in claim 6 wherein said correction circuits are disposed in the circuits connecting the contrast adjustment device to the contrast variation circuits assigned to said $n-1$ guns.

9. The device as claimed in claim 6, wherein said correction circuit consists of slope switching circuit.

10. The device as claimed in claim 6, wherein said correction circuit includes an amplifier-summator circuit receiving the signal to be corrected directly and through at least one threshold device.

* * * * *